3,267,648
AIR WASHER
Luther H. Allcorn, Jr., Lewisville, N.C., assignor to The Bahnson Company, Winston-Salem, N.C., a corporation of North Carolina
Filed June 4, 1964, Ser. No. 372,464
1 Claim. (Cl. 55—258)

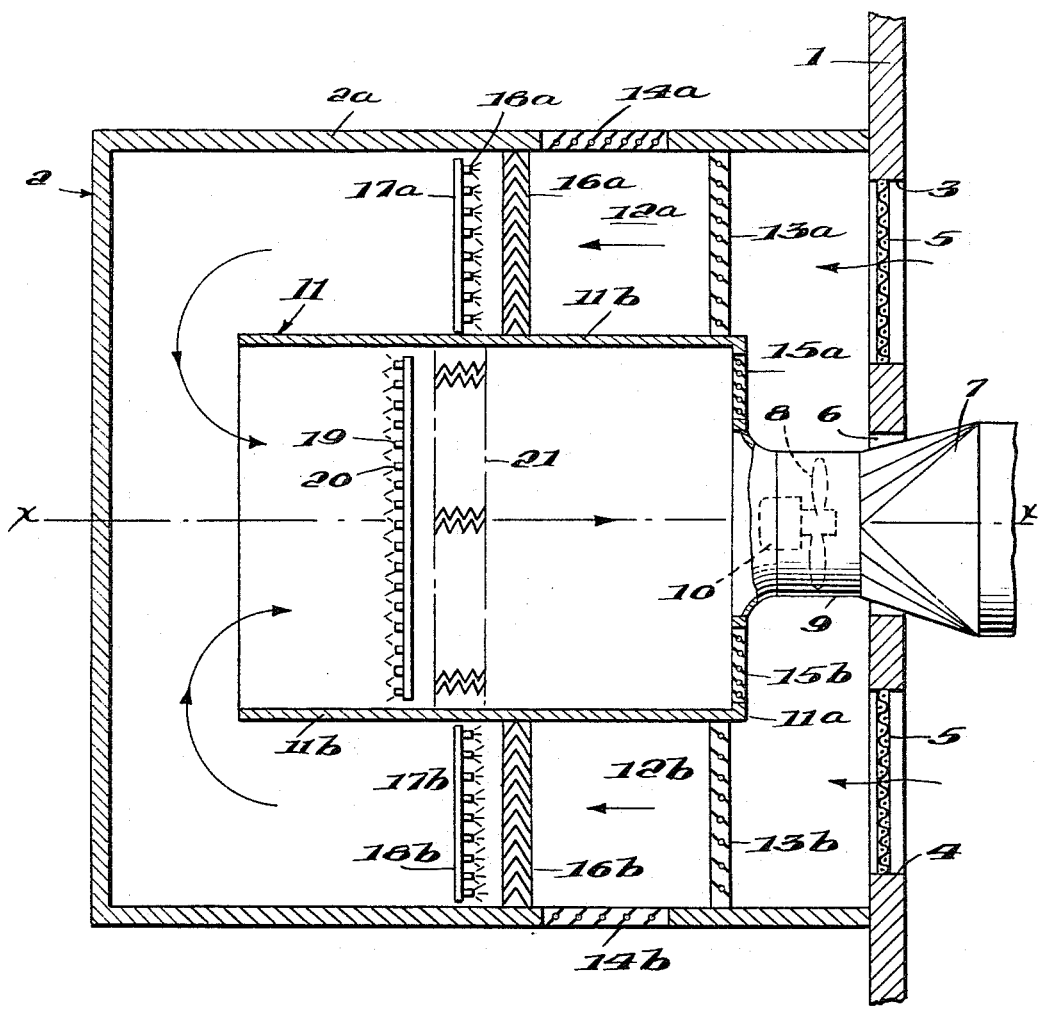

The present invention relates to air washers for conditioning air which is passed through the washer. This conditioning can include heating or cooling of the air, as well as humidification or de-humidification and also removal of contaminants such as dirt, dust and lint, etc., which may be entrained in the air as it enters the washer unit for treatment.

All air washers include a spray chamber wherein the air is caused to come into intimate contact with sprays of water, the primary function of the spray chamber being to humidify or de-humidify the air stream by virtue of the relation of the spray water to the air temperature. If the water being sprayed into the air stream in the saturation area of the chamber is below the dewpoint of the incoming air, water vapor in the incoming air will be condensed out of the air stream onto the cold droplets of water being sprayed-in and the net result will be a drier air delivered from the output end of the washer. If the temperature of the spray water equals the dewpoint of the incoming air, practically nothing will happen to the air passed through the washer so far as humidity is concerned. On the other hand, if the temperature of the spray water is higher than the dewpoint of the incoming air, humidification will take place, and the amount of humidification, commonly referred to as the saturation efficiency, will depend upon several variables such as, air velocity through the washer, the fineness of spray from the spray nozzles, the extent to which the spray nozzles cover the area through which the air passes, the length of time intimate contact is maintained between the water sprays and air and the degree of turbulence or scrubbing action as between the small water particles in the sprays and the air.

A primary object of the invention is to provide an improved air washer of the general type described wherein the washing action is considerably improved by providing a relatively long water-air passage in combination with a 180° change in direction of the air through the washer between inlet and outlet thus providing a longer and more turbulent contact as between the water and air. The improved construction provides for intimate contact before, during and after making the 180° turn in flow direction within the washer, the air being subjected to water sprays both before and after making the turn.

Another object of the invention is to provide an improved and essentially self-contained compact air washer which can be easily installed as an "add-on" unit outside a building wall, it being necessary only to provide a suitable base for the unit and the necessary number of wall openings to bring the contaminated air out of the building for washing and return of the conditioned and cleansed air into the building.

The foregoing as well as other objects and advantages of the invention will become more apparent from the following description of one suitable embodiment and from the accompanying drawing which illustrates it. The single view presented in the drawing is essentially a horizontal section through the washer and illustrates the principles involved and which are hereinafter defined in the appended claim.

With reference now to the drawing, a wall of the building from the interior of which it is desired to remove contaminated air for washing and conditioning is indicated at 1. The air washer unit which can be installed on a concrete pad outside of this wall is indicated generally at 2. With the illustrated embodiment, it is necessary to provide only three openings in the building wall to accommodate the washer unit. Two of these openings, shown at 3 and 4, are provided with screens 5 for separating out any lint-like material which may be entrained in the air and serve as air inlets to the washer unit. The third opening indicated at 6 and located intermediate inlet openings 3, 4, is provided as a pass-through for the outlet duct 7 from an axial flow fan 8 by which the air is circulated through the washer, this outlet duct serving to return the cleansed air into the building. As is evident from the drawing, the fan 8 located inside of its housing 9 and driven by an electric motor 10, has its axis of rotation centered along the longitudinal axis $x—x$ of the washer unit. The intake side of the fan housing is secured in place over the air discharge opening in an end wall $11a$ of an interior casing 11 and the side walls $11b$ of this casing extend parallel with and are spaced from the side walls $2a$ of the washer housing so as to provide parallel air flow passageways $12a$ and $12b$ which are associated respectively with the air inlet openings 3 and 4. A set of room air dampers $13a$ is located at the entrance to passageway $12a$, and serves to control the amount of air which is permitted to enter the washer from inlet opening 3. A similar set of dampers $13b$ is provided to control the amount of air permitted to flow through passageway $12b$ from air inlet opening 4. Set into the side walls $2a$ of the washer housing on the downstream side of dampers $13a$, $13b$ are two other sets of dampers $14a$, $14b$ which control the amount of fresh air which is taken into the washer from the outside. In addition to these dampers, the end wall $11a$ of the interior casing is also provided with by-pass dampers $15a$, $15b$ by which air can be re-circulated through the fan 8 without coming into contact with the water sprays. If desired, an air heater unit, not shown, may be associated with each of these by-pass dampers.

These various dampers are arranged to be controlled independently or inter-dependently, in known manner according to the particular conditioning desired for the room air so that when the by-pass dampers $15a$, $15b$ are closed, the inlet dampers $13a$, $13b$ will be open, and vice versa. Control over the fresh air dampers $14a$, $14b$ can be made to be either dependent upon or independent of the control provided for the room air dampers.

Located transversely of the inlet air passageway $12a$ on the downstream side of the fresh air dampers $14a$ is a set of V-shaped baffles $16a$ which are provided to prevent water from being sprayed in an upstream direction towards the air inlet in the event that the sprays are left on while the fan is cut off. A similar set of baffles $16b$ is provided across the other air inlet passageway $12b$.

Disposed transversely of passageway $12a$ on the downstream side of baffles $16a$ is a header pipe $17a$ provided with a series of longitudinally spaced nozzles $18a$ from which water is sprayed upstream in a direction generally counter-current to the flow of air so as to provide the first mixing zone wherein the contaminated air comes into contact with the water sprays to initiate the washing action. A similarly located header pipe $17b$ and nozzles $18b$ are provided for the other inlet passageway $12b$.

The opposite end of the interior casing 11 is open and terminates in spaced relation to the end wall $2b$ of the outer washer housing so as to require the air after reaching the left ends of passageways $12a$, $12b$ to turn through an angle of 180° before entering this end of the inner casing 11. This turning action of the air stream before entering the middle section of the washer creates turbulence and hence, enhances the desired mixing action of the water and air involved in the conditioning and cleansing process. After making the 180° turn, the air from both passageways 12a, 12b passes backward through the interior of casing 11 and encounters further sprays as provided by a transversely placed header pipe 19 and nozzles 20 spaced longitudinally along the same. As with the other nozzles, the sprays issue from nozzles 20 in a direction counter to the flow of air from left to right.

After passing through the spray nozzles 20, the washed air is now caused to pass through an eliminator section 21 to remove any water droplets which may have become entrained in the air stream. This eliminator section can be of any known type and the one illustrated is seen to be of the broken plate type which provides, as is well known, a zig-zag passageway through which the air is forced and changed in direction repeatedly between its inlet and outlet ends which causes the water droplets to impinge upon and be retained by the surfaces of the plates. The conditioned and cleansed air now passes into the intake plenum of fan 8 and is delivered through the outlet 7 into the room from whence it originally came.

A sump associated with the lower part of the washer unit and which is provided with a circulating pump, not illustrated, serves to collect and re-circulate the water through the spray nozzles.

In conclusion, it will be evident that the improved washer construction presents not only a compact and fairly simple construction which requires only a minimum of modification to the building unit with which it is to be associated but also represents a considerable improvement in washing efficiency. The double pass which the air must make in traveling twice through the length of the washer unit provides a unique and longer path for the air in contact with the water, and the 180° change in flow direction of the air at one end of the washer unit creates considerable turbulence which provides more intimate contact and hence, enhances the desired mixing and conditioning and cleansing actions as between the air and water.

I claim:

In an air washer for removing air from within a room for washing and for returning the conditioned and cleansed air into the room, the combination comprising an outer washer housing generally enclosing the washer components, an inner casing located within and extending longitudinally of said housing and spaced from the side walls thereof to thus establish a longitudinally extending outer passageway between each side wall and the appertaining wall of said inner casing, air inlet means placing the room in communication with the air entrance end to each of said outer air passageways, first spray nozzles in each of said outer air passageways for discharging water into contact with the air passing therethrough, said first spray nozzles having a direction counter to the direction of air flow, baffle means located in each of said outer air passageways on the upstream side of said spray nozzles for blocking passage of water in that direction, an air discharge passageway from the air discharge end of said inner casing and in which is located a fan unit for moving air in the washer and returning it to the room, the opposite air inlet end of said inner casing being open and spaced from an end wall of said washer housing to effect a turning of the air through 180° after reaching the air exit ends of said outer air passageways for flow in the opposite direction through said inner casing to the inlet of said fan unit, second spray nozzles within said inner casing directing water sprays counter to the direction of air flow therethrough, said first and second spray nozzles establishing a mixing action as between the air and water sprays before, during and after a reversal in direction of air flow involved in the transfer thereof from said outer air passageways to said inner casing, a water droplet eliminator located within said inner casing intermediate the spray nozzles therein and said fan unit, a first damper means located in each of said outer air passageways, fresh air damper means located between said first damper means and said spray nozzles in said outer air passageways for controlling the amount of fresh air taken into the washer, and by-pass damper means located in a wall of said inner casing for permitting air received through said air inlet means to be returned directly into the room through said fan without coming into contact with the water sprays.

References Cited by the Examiner

UNITED STATES PATENTS

| | | | |
|---|---|---|---|
| 1,471,112 | 10/1923 | Ellis | 55—258 X |
| 2,189,895 | 2/1940 | Grutzner | 55—267 X |
| 2,273,194 | 2/1942 | Hedberg et al. | 55—8 |
| 2,420,707 | 5/1947 | Hinger | 55—233 X |

ROBERT F. BURNETT, *Primary Examiner.*

D. K. DENENBERG, *Assistant Examiner.*